(No Model.)
P. & W. W. RULIFSON.
BEAN HARVESTER.
No. 364,603. Patented June 7, 1887.
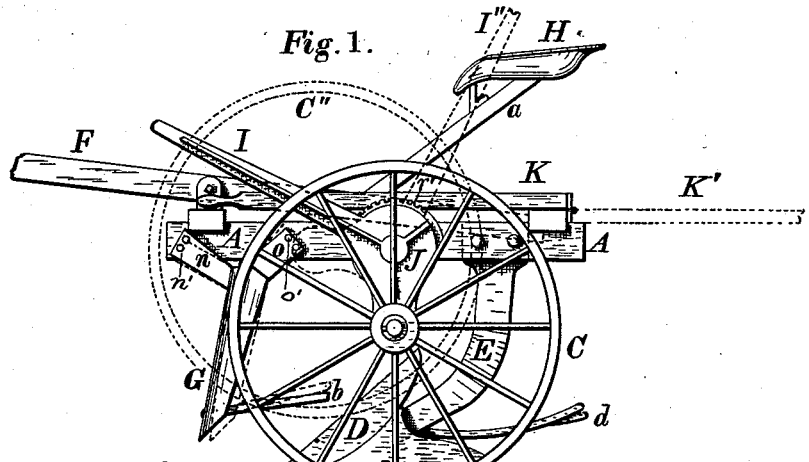
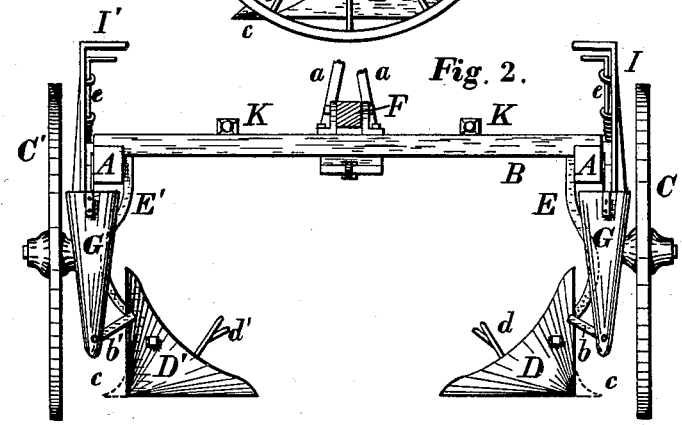
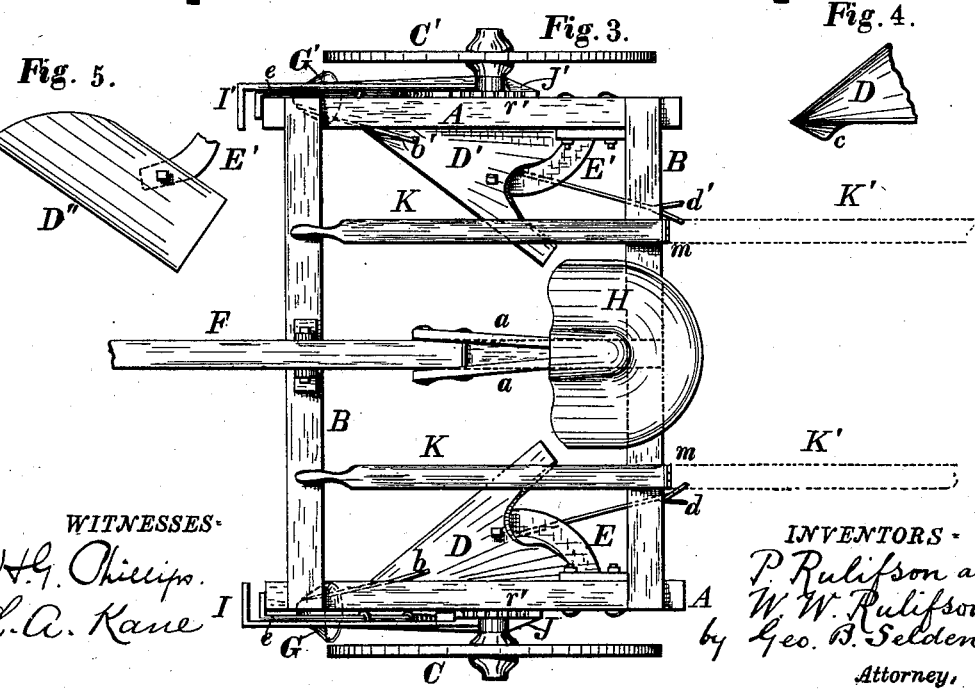
WITNESSES:
H. G. Phillips.
L. A. Kane
INVENTORS:
P. Rulifson and
W. W. Rulifson,
by Geo. B. Selden,
Attorney.
N. PETERS, Photo-Lithographer, Washington, D. C.

UNITED STATES PATENT OFFICE.

PHILETUS RULIFSON AND WILLIAM W. RULIFSON, OF WHEATLAND, NEW YORK.

BEAN-HARVESTER.

SPECIFICATION forming part of Letters Patent No. 364,603, dated June 7, 1887.

Application filed December 26, 1884. Serial No. 151,140. (No model.)

*To all whom it may concern:*

Be it known that we, PHILETUS RULIFSON and WILLIAM W. RULIFSON, of Wheatland, Monroe county, New York, have jointly invented certain Improvements on Bean-Harvesters, of which the following is a specification, reference being had to the accompanying drawings.

Our invention relates to certain improvements in machines for harvesting beans, which improvements are fully described in the following specification, and the novel features thereof specified in the annexed claims.

Our improved bean harvester is represented in the accompanying drawings, in which—

Figure 1 is a side elevation. Fig. 2 is a front elevation. Fig. 3 is a plan view. Fig. 4 represents a modified form of point. Fig. 5 represenes another modification of the same.

Our improved bean-harvester consists, essentially, of the adjustable frame A B, supported on the wheels C C', and having the shares D D', attached thereto by the outwardly-curved arms E E', and the points G G', attached to the frame in front of the shares. The machine is provided with a tongue or thills, F, and is designed to operate on two adjacent rows of beans at the same time, uprooting each row and throwing the vines together between them. The frame is supported on the wheels C C' by means of the pivoted arms J J', provided with the handles I I', by which the frame may be adjusted up and down, to vary the depth at which the shares enter the ground or to throw them entirely out of action. The position of the wheels when the shares enter the ground to the greatest depth is indicated by the dotted lines C'' I'' in Fig. 1. A notched segment, $r'$, is attached to each side of the frame, and a spring-catch, $e$, on the lever I I' engages with the notches, so that the frame may be adjusted and held at any desired distance above the ground.

The frame-work consists of the side bars, A A, connected together by the cross-pieces B B. The frame-work supports the driver's seat H by means of the braces or springs $a\ a$. The frame is also provided with the handles K K, which are preferably hinged at $m\ m$, Fig. 3, so that they can be folded up across the machine, as represented by the full lines, or extended behind the machine for use in shifting the position or controlling the course of the machine, as indicated by the dotted lines K' K' in Fig. 3.

The shares D D' are made of any suitable shape adapted to enter the ground and turn it inward, resembling the points ordinarily used on plows. In Fig. 4 we have represented in full lines, and in Fig. 2 in dotted lines, a modification in which the share is provided at its point with an outwardly-projecting edge or cutting-point, $c$. At D'', Fig. 5, we have shown another form of point, made of sheet metal of suitable thickness, and which we prefer to use in some soils where many stones are encountered.

As shown in Figs. 1 and 2, the respective shares are connected to the frame by standards E E', each of which is curved or bent outward, the curvature commencing at or near the point of attachment to the share. This curvature permits the vines which pass over the share from fouling or accumulating upon the standards, and is a feature of great practical importance.

We are aware that standards rising vertically from a share have been curved outward at their upper ends to admit of their connection to the carrying-frame; but it is manifest that this construction did not secure the result accomplished by a standard curved outward at its lower part beyond the line of the share.

The shares are also provided with the rods or arms $d\ d'$, which project backward and inward and assist in throwing the vines toward the center. As shown in the drawings, these rods may be split or divided toward their ends, to increase the efficiency of their action.

The points G G' are attached to the frame in front of and preferably a little outside of the shares D D'. The points are so attached to the frame that they may be adjusted up and down to set the points to penetrate the earth to different depths. They may be provided with the arms $n\ o$, by which their inclination, as well as their height, may be adjusted, these arms being provided with a number of holes, $n'\ o'$, and attached to the frame by bolts. The points G G' are also provided with the arms $b\ b'$, which project inward at an angle and operate to turn the vines inward as the machine is drawn along.

We have demonstrated, by practical use extending over a considerable period, with a number of machines the thorough efficiency of the improved bean-harvester herein described. It is simple, cheap, and durable, and effects a great saving in time and labor in the gathering of the crop in question.

We claim—

1. The combination, with the frame A B, adjustably supported on the wheels C C', of shares D D', connected with the frame by the outwardly-curved arms E E', substantially as and for the purposes set forth.

2. The combination, with the frame A B, adjustably supported on the wheels C C', of the shares D D', provided with arms $d\ d'$ and connected with the frame by the outwardly-curved arms E E', substantially as and for the purposes set forth.

3. The combination, with the frame A B, adjustably supported on the wheels C C', of shares D D', connected with the frame by the outwardly-curved arms E E', and the points G G', substantially as and for the purposes set forth.

4. The combination, with the frame A B, adjustably supported on the wheels C C', of the shares D D', connected with the frame by the outwardly-curved arms E E' and provided with the laterally-projecting points $c\ c$, substantially as and for the purposes set forth.

5. The combination, with the frame A B, adjustably supported on the wheels C C', of the shares D D', connected with the frame by the outwardly-curved arms E E', and the points G G', adjustably connected to the frame by perforated plates $o\ n$, substantially as and for the purposes set forth.

6. The combination, with the frame A B, adjustably supported on the wheels C C', of the shares D D', connected with the frame by the outwardly-curved arms E E', points G G', and folding handles K K, substantially as and for the purpose set forth.

7. The combination, with the frame A B, adjustably supported on the wheels C C', of shares D D', connected with the frame by the outwardly-curved arms E E', and the points G G', provided with arms $b\ b'$, substantially as and for the purposes set forth.

8. In a bean-harvester, the combination of a share or cutter to act on the bean-stalks and a standard to carry said share, curved outward at its lower end, substantially as described, whereby the vines are permitted to pass over the share without lodging against the standard.

9. In a bean-harvester, in combination with a wheeled frame, a share, D, having the front horizontal edge oblique to the line of travel, a vine-lifter, G, located in front of the forward part of the share, and a gathering-arm, $b$, extending inward and rearward from the lifter in a line approximately parallel with the edge of the share.

PHILETUS RULIFSON.
WILLIAM W. RULIFSON.

Witnesses:
GEO. B. SELDEN,
L. A. KANE.